US012706427B2

(12) United States Patent
Zhang et al.

(10) Patent No.: US 12,706,427 B2
(45) Date of Patent: Aug. 11, 2026

(54) FIXED EQUIPMENT, ALIGNMENT SYSTEM AND METHOD

(71) Applicants: Tyco Electronics (Shanghai) Co., Ltd., Shanghai (CN); TE Connectivity Services GmbH, Schaffhausen (CH)

(72) Inventors: Rong Zhang, Shanghai (CN); Dandan (Emily) Zhang, Shanghai (CN); Roberto Francisco-Yi Lu, Bellevue, WA (US); Lei (Alex) Zhou, Shanghai (CN); Xianghao (Jorge) Bao, Shanghai (CN)

(73) Assignees: TE Connectivity Services GmbH, Schaffhausen (CH); Tyco Electronics (Shanghai) Co., Ltd., Shanghai (CN)

( * ) Notice: Subject to any disclaimer, the term of this patent is extended or adjusted under 35 U.S.C. 154(b) by 662 days.

(21) Appl. No.: 18/165,455

(22) Filed: Feb. 7, 2023

(65) Prior Publication Data

US 2023/0253749 A1 Aug. 10, 2023

(30) Foreign Application Priority Data

Feb. 7, 2022 (CN) ........................ 202210116567.X

(51) Int. Cl.
*H01R 43/02* (2006.01)

(52) U.S. Cl.
CPC ................................ *H01R 43/0263* (2013.01)

(58) Field of Classification Search
CPC .................................................. H01R 43/0263
See application file for complete search history.

(56) References Cited

U.S. PATENT DOCUMENTS

2013/0186941 A1 * 7/2013 Nikkhoo ............ H05K 13/0015 228/180.5
2018/0206344 A1 * 7/2018 Deng ..................... H05K 3/325

* cited by examiner

*Primary Examiner* — Livius R. Cazan
(74) *Attorney, Agent, or Firm* — Barley Snyder

(57) ABSTRACT

A fixing system includes a wire clamping device and a fixture. The wire clamping device is adapted to clamp and fix a plurality of wires. The fixture includes a base plate, a wire fixing member adapted to fix the plurality of wires clamped by the wire clamping device on the base plate, and a circuit board fixing member adapted to fix a circuit board on a front face of the base plate. The wire fixing member and the circuit board fixing member are arranged so as to align cores or conductors of the plurality of wires clamped by the wire clamping device with a plurality of wire welding pads of the circuit board placed on the base plate.

20 Claims, 6 Drawing Sheets

FIXED EQUIPMENT, ALIGNMENT SYSTEM AND METHOD

CROSS-REFERENCE TO RELATED APPLICATIONS

This application claims the benefit of Chinese Patent Application No. CN202210116567.X filed on Feb. 7, 2022, in the State Intellectual Property Office of China, the whole disclosure of which is incorporated herein by reference.

FIELD OF THE INVENTION

The present invention relates to a wire alignment system and an alignment method.

BACKGROUND

In the prior art, before welding the wires to the circuit board, the wire cores of the wires must be aligned with the wire welding pads on the circuit board. After being aligned, the wires and the circuit board must be fixed to ensure that they will not shift during welding of the wire cores. In the prior art, manual alignment is usually adopted, which is very inefficient. Moreover, the existing fixtures or fixed equipment used to fix the wires and the circuit board are complex and difficult to operate.

SUMMARY

According to an embodiment of the present disclosure, a fixing system or fixed equipment includes a wire clamping device and a fixture. The wire clamping device is adapted to clamp and fix a plurality of wires. The fixture includes a base plate, a wire fixing member adapted to fix the plurality of wires clamped by the wire clamping device on the base plate, and a circuit board fixing member adapted to fix a circuit board on the base plate. The wire fixing member and the circuit board fixing member are arranged so as to align conductors of the plurality of wires clamped by the wire clamping device with a plurality of wire welding pads of the circuit board.

BRIEF DESCRIPTION OF THE DRAWINGS

The invention will now be described by way of example with reference to the accompanying Figures, of which.

DETAILED DESCRIPTION OF THE EMBODIMENTS

Figure 1:
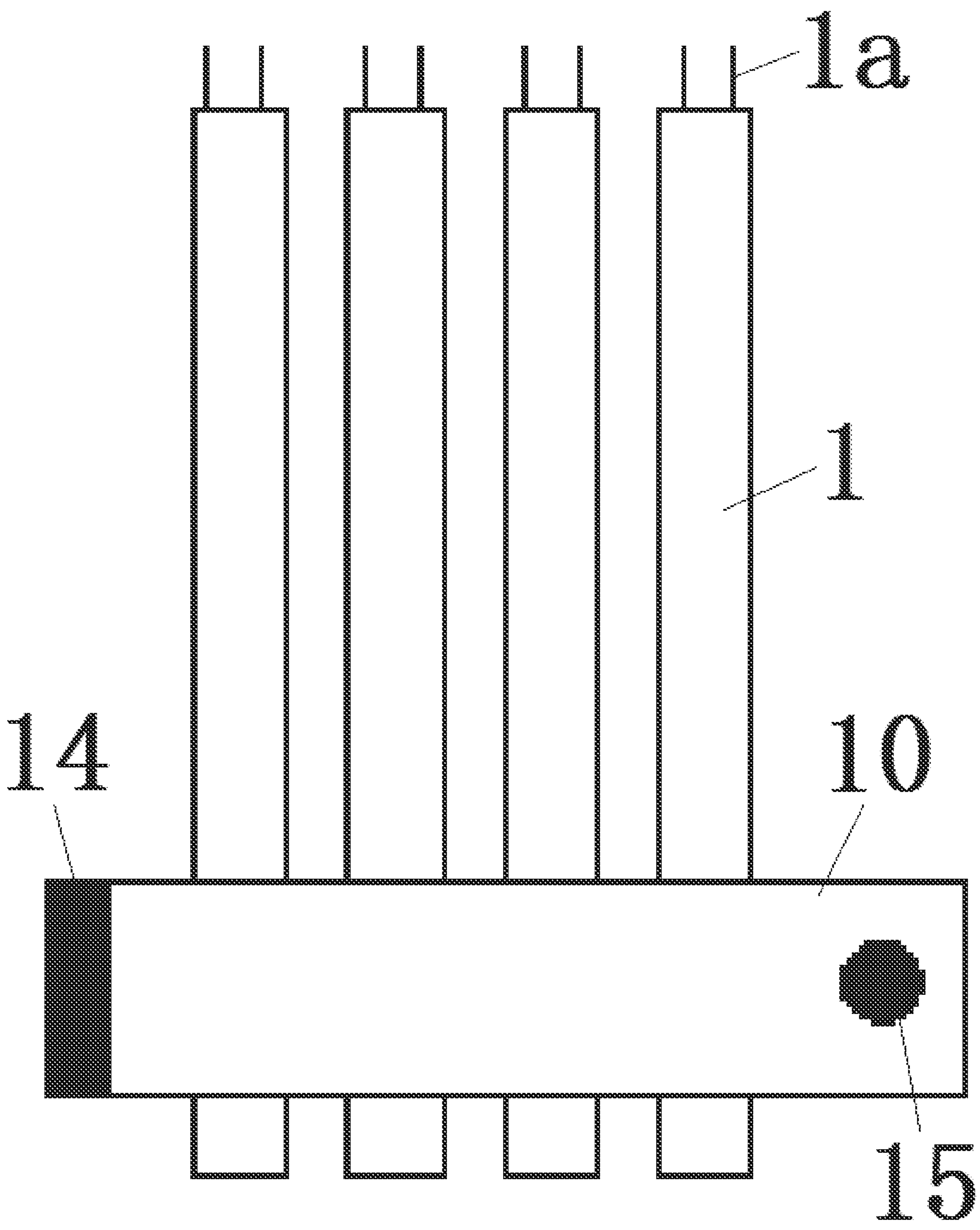
FIG. 1 shows a plan view of a fixing system according to an exemplary embodiment of the present invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to an embodiment of the present disclosure, a fixing system includes a wire clamping device and a fixture. The wire clamping device is suitable for clamping and fixing a plurality of wires. The fixture includes a base plate, a wire fixing member for fixing a plurality of wires clamped by the wire clamping device on the base plate, and a circuit board fixing member for fixing a circuit board on a front face of the base plate. After wire cores or conductors of the plurality of wires clamped by the wire clamping device are aligned with a plurality of wire welding pads of the circuit board placed on the base plate, the plurality of wires are fixed on or to the base plate by the wire fixing member. The circuit board is also fixed on or to the base plate by the circuit board fixing member.

According to another embodiment of the present disclosure, an alignment system for aligning cores or conductors of wires with wire welding pads on a circuit board is provided. The alignment system includes the above-described fixing system, as well as first and second moving devices. The first moving device moves the wire clamping device in a first direction, so as to adjust a first deviation $\Delta X$ in the first direction between the wire core of the wire clamped by the wire clamping device and the wire welding pad of the circuit board to zero. The second moving device moves the circuit board in a second direction perpendicular to the first direction, so as to adjust a second deviation $\Delta Y$ in the second direction between the wire core of the wire clamped by the wire clamping device and the wire welding pad of the circuit board to zero.

According to another embodiment of the present disclosure, a method for aligning a wire core of a wire with the wire welding pad on the circuit board is provided. The method includes the steps of: 1) providing the above alignment system; 2) clamping and fixing a plurality of wires by the wire clamping device; 3) moving the wire clamping device in the first direction and moving the circuit board in the second direction until the first deviation $\Delta X$ and the second deviation $\Delta Y$ equal to zero; and 4) fixing the wires on the base plate by the wire fixing member and fixing the circuit board on the base plate by the circuit board fixing member.

Figure 2:
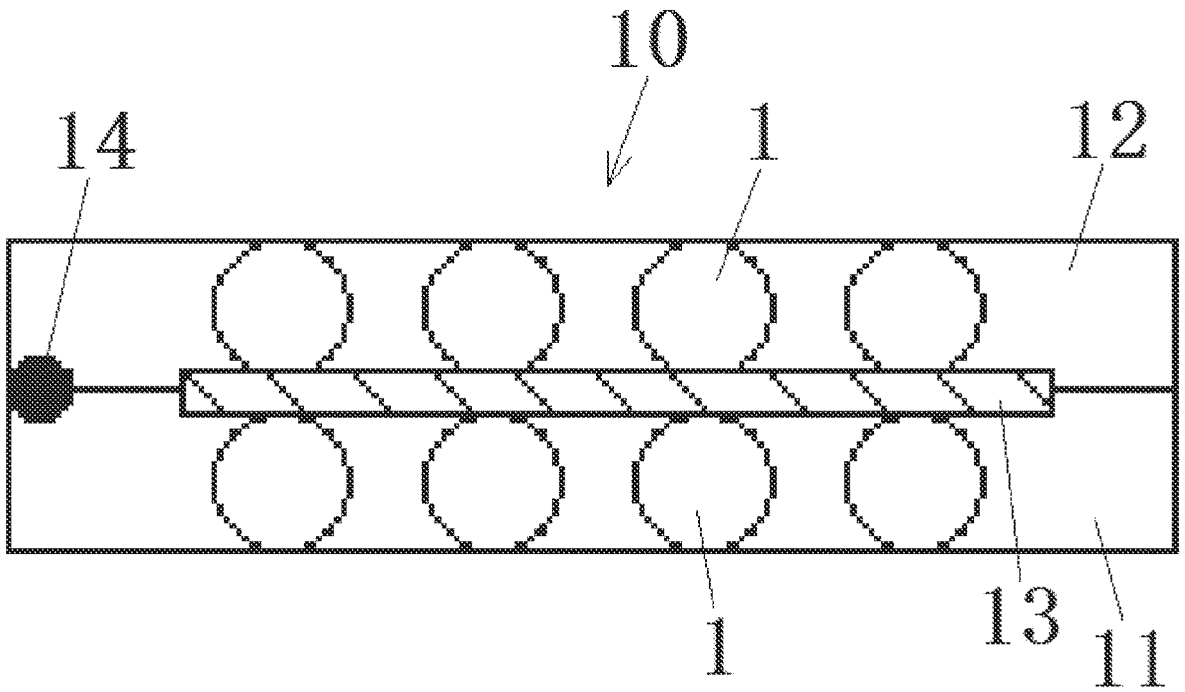
FIG. 2 shows a side view of a cable clamping device according to an exemplary embodiment of the present invention.
Figure 3:
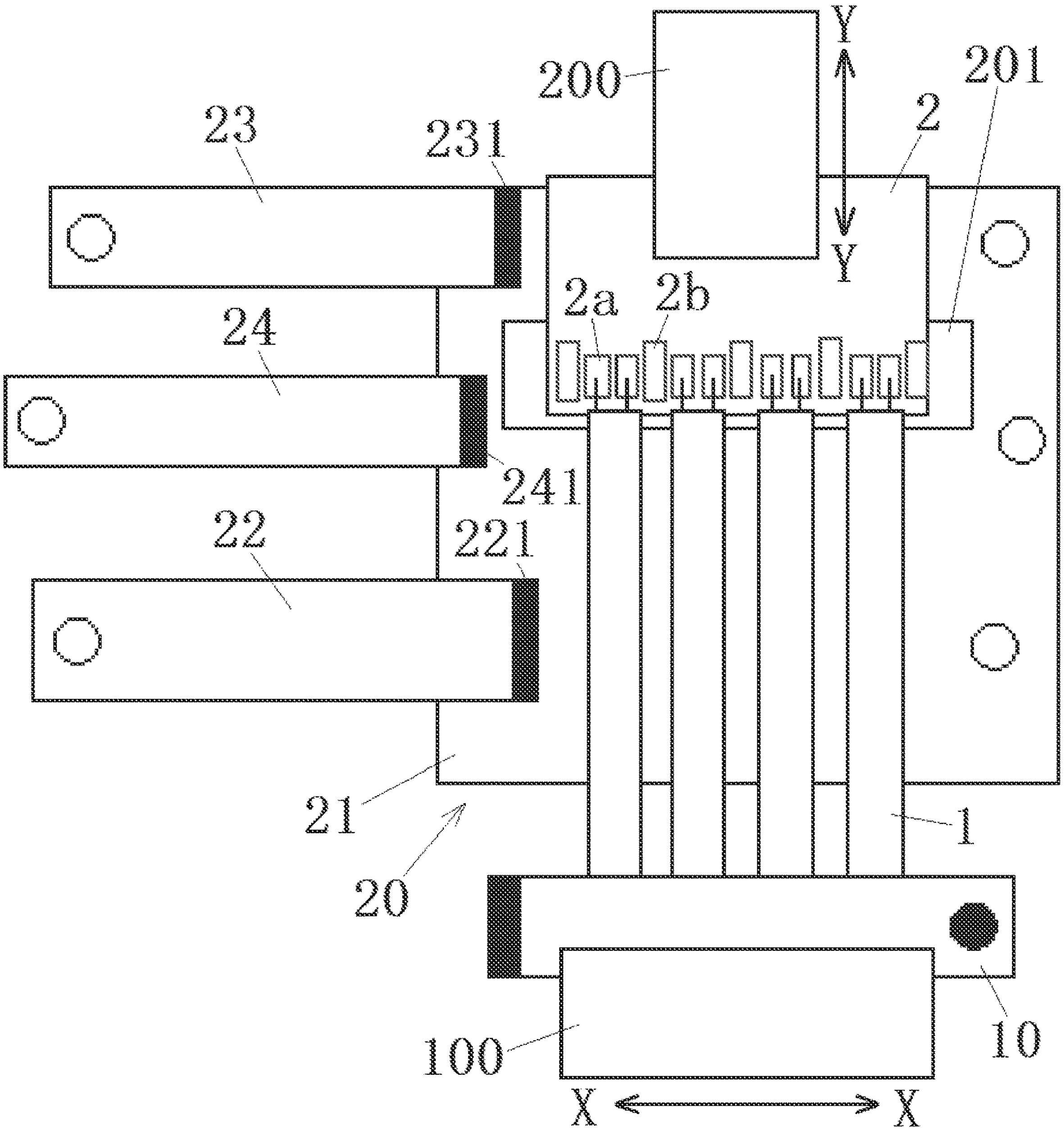
FIG. 3 shows a schematic diagram of an alignment system according to an exemplary embodiment of the present invention, wherein the alignment system includes a fixture or fixing system.

FIG. 1 is a plan view of a fixing system according to an exemplary embodiment of the present invention. FIG. 2 is a side view of a cable clamping device 10 according to an exemplary embodiment of the present invention. FIG. 3 is a schematic diagram of an alignment system according to an exemplary embodiment of the present invention, wherein the alignment system includes a fixing system. As shown in FIGS. 1-3, the fixing system includes a wire clamping device 10 and a fixture 20. The wire clamping device 10 is suitable for clamping and fixing a plurality of wires 1. The fixture 20 comprises a base plate 21, a wire fixing member 22 and a circuit board fixing member 23. The wire fixing member 22 is used to fix a plurality of wires 1 clamped by the wire clamping device 10 on the base plate 21. The circuit board fixing member 23 is used to fix a circuit board 2 on a front face of the base plate 21.

Figure 4:
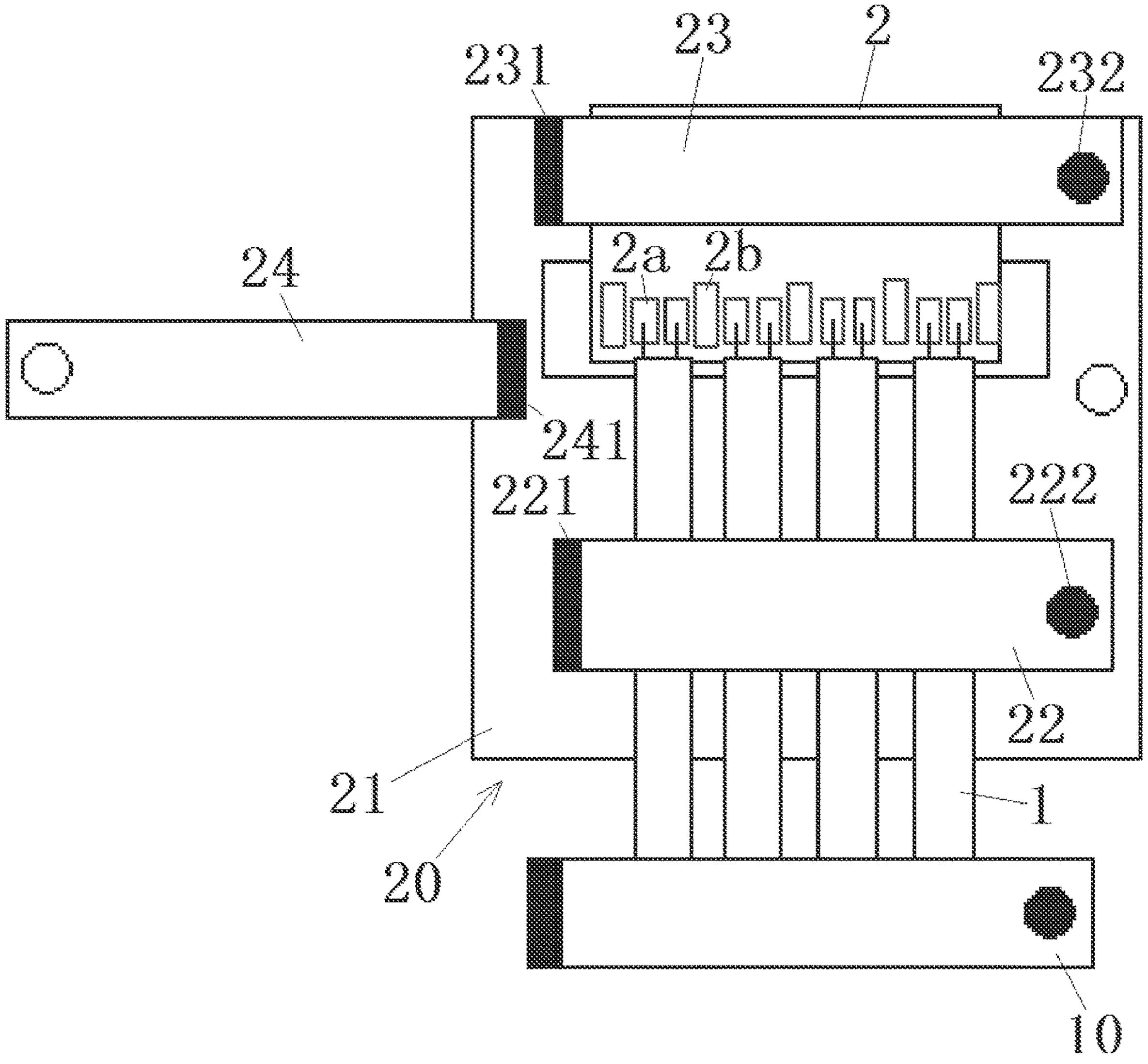
FIG. 4 shows a schematic diagram of a fixing system according to an exemplary embodiment of the present invention, wherein the wires and the circuit board have been aligned and fixed to the base plate.

FIG. 4 is a schematic diagram of a fixing system or fixed equipment according to an exemplary embodiment of the present invention, wherein the wires 1 and the circuit board 2 are aligned and fixed to the base plate 21. As shown in FIGS. 1-4, after wire cores or conductors 1*a* of the plurality of wires 1 clamped by the wire clamping device 10 are aligned with a plurality of wire welding pads 2*a* of the circuit board 2 placed on the base plate 21, the plurality of wires 1 are fixed on the base plate 21 by the wire fixing member 22, and the circuit board 2 is fixed on the base plate 21 by the circuit board fixing member 23.

The welding area of the circuit board 2 is located in an opening 201 formed through the base plate 21. In this way, the wire welding pads 2*a* and busbar welding pads 2*b* on the front face and back face of the circuit board 2 fixed on the base plate 21 are exposed through the opening 201. It should be noted that while the figures herein only show the front face of the base plate 21, a back face thereof is substantially similar to the front face.

The wire clamping device 10 includes a base seat 11, a top cover 12 and a separating plate 13. The top cover 12 is rotatably connected to the base seat 11, and can be rotatably opened and closed relative to the base seat 11. The separating plate 13 is arranged between the base seat 11 and the top cover 12, and is used to divide the plurality of wires 1 into upper and lower layers. The upper layer of wires of the plurality of wires 1 are to be welded to the wire welding pads 2*a* on the front face of the circuit board 2, and the lower layer of wires of the plurality of wires 1 are to be welded to the wire welding pads 2*a* on the back face of the circuit board 2.

The upper layer of wires of the plurality of wires 1 are clamped between the top cover 12 and the separating plate 13. The lower layer of wires of the plurality of wires 1 are clamped between the base seat 11 and the separating plate 13. The base plate 21 is inserted between the upper layer of wires and the lower layer of wires of the plurality of wires 1. The thickness of the separating plate 13 is slightly greater than the thickness of the base plate 21, so that the base plate 21 can be easily inserted between the upper layer of wires 1 and the lower layer of wires 1. One end of the top cover 12 is rotatably connected to the base seat 11 by a first hinge 14, and the other end of the top cover can be fixed to the base seat 11 by a first fastener 15.

The front face and back face of the base plate 21 are provided with respective wire fixing members 22. The wire fixing member 22 arranged on the front face of the base plate 21 is used to fix the upper layer of wires 1 on the front face of the base plate 21. The wire fixing member 22 arranged on the back face of the base plate 21 is used to fix the lower layer of wires 1 on the back face of the base plate 21. The wire fixing member 22 is rotatably connected to the base plate 21 such that it may be opened and closed rotatably with respect to the base plate 21. Likewise, the circuit board fixing member 23 is rotatably connected to the base plate 21 such that it may be rotatably opened and closed with respect to the base plate 21. One end of the wire fixing member 22 is rotatably connected to the base plate 21 by a second hinge 221, and the other end thereof can be fixed to the base plate 21 by a second fastener 222. One end of the circuit board fixing member 23 is rotatably connected to the base plate 21 by a third hinge 231, and the other end can be fixed to the base plate 21 by a third fastener 232.

Figure 5:
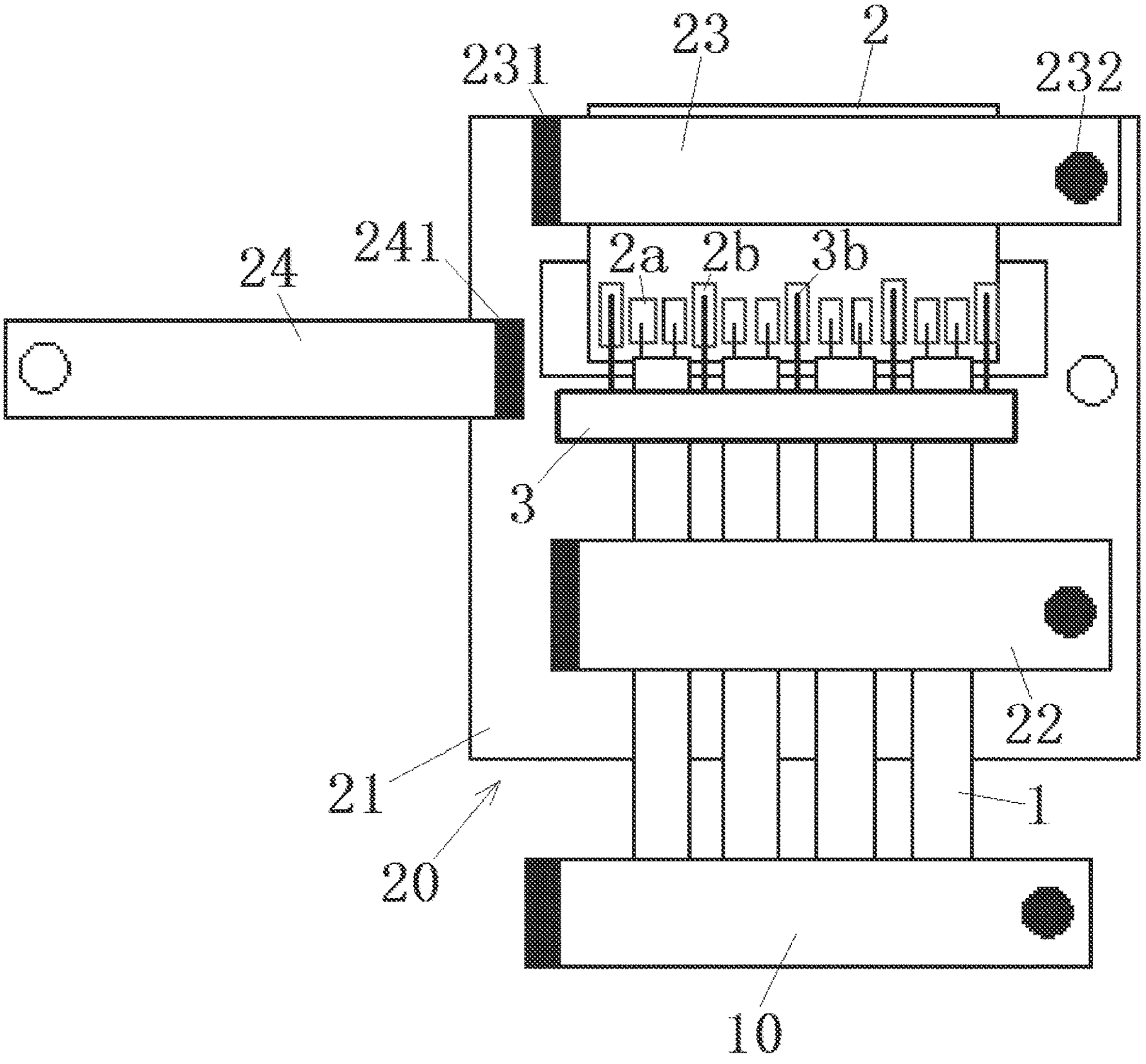
FIG. 5 shows a schematic diagram of a fixing system according to an exemplary embodiment of the present invention, in which a busbar is shown.
Figure 6:
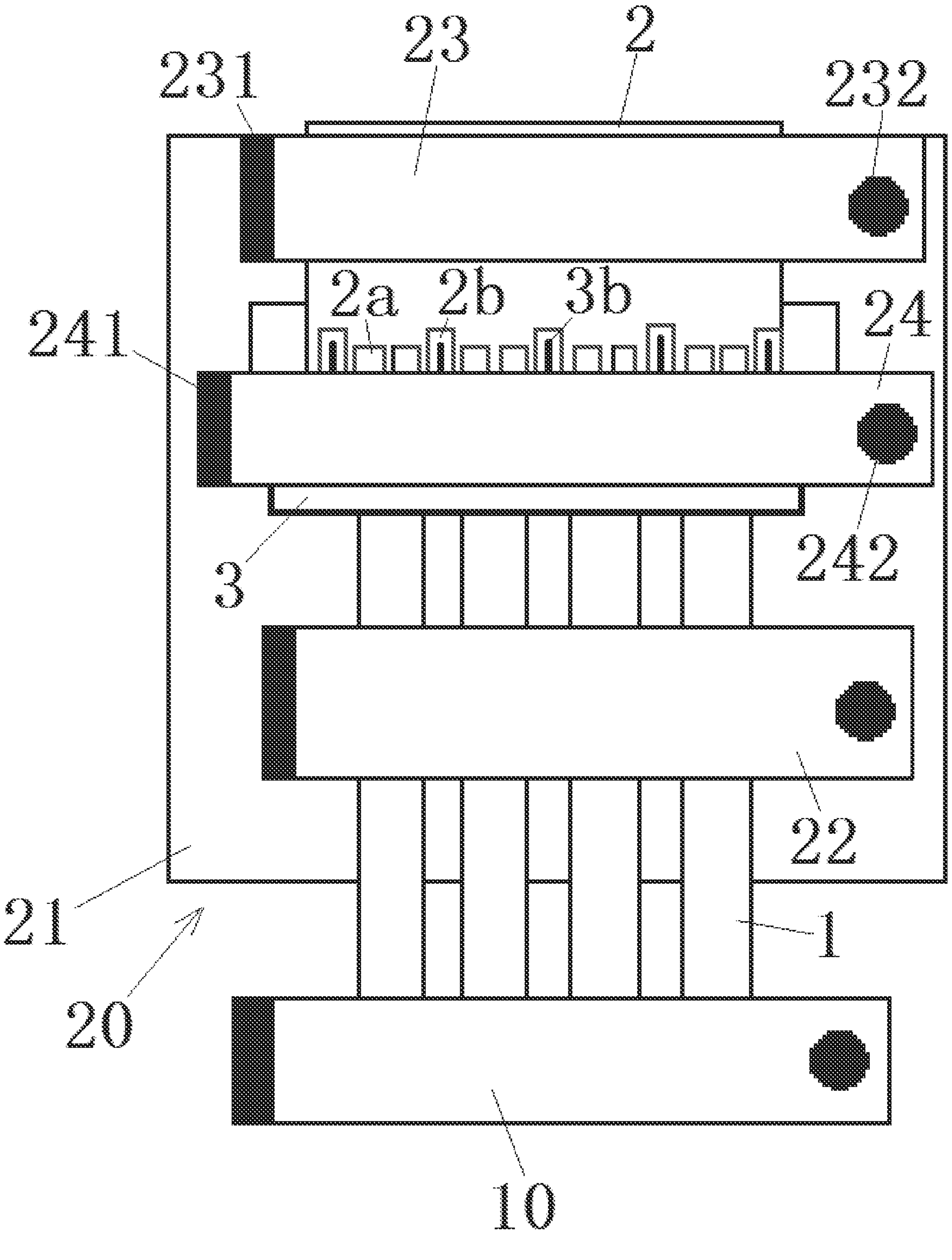
FIG. 6 shows a schematic diagram of a fixing system according to the exemplary embodiment of FIG. 5, wherein the busbar has been fixed to the base plate.

FIG. 5 is a schematic diagram of a fixing system according to an exemplary embodiment of the present invention, in which a busbar 3 is shown. FIG. 6 is a schematic diagram of the system of FIG. 5, wherein the busbar 3 has been fixed to the base plate 21. As shown in FIGS. 1-6, the fixture 20 also includes a busbar fixing member 24, which is used to fix the busbar 3 on the base plate 21 after a plurality of conductors 3*b* of the busbar 3 are aligned with a plurality of busbar welding pads 2*b* on the circuit board 2. The front face and back face of the base plate 21 are provided with respective busbar fixing members 24. The busbar fixing member 24 arranged on the front face of the base plate 21 is used to fix the busbar 3, which is located on the front face of the base plate 21, onto the front face of the base plate 21. The busbar fixing member 24 arranged on the back face of the base plate 21 is used to fix the busbar 3, which is located on the back face of the base plate 21, onto the back face of the base plate 21. The busbar fixing member 24 is rotatably connected to the base plate 21 so as to be opened and closed rotatably with respect to the base plate 21. In the illustrated embodiment, one end of the busbar fixing member 24 is rotatably connected to the base plate 21 by a fourth hinge 241, and the other end can be fixed to the base plate 21 by a fourth fastener 242.

According to another embodiment of the present disclosure, an alignment system is used to align the wire cores 1*a* of the wires 1 with the wire welding pads 2*a* on the circuit board 2. The alignment system includes the above-described fixed equipment or fixing system, a first moving device 100 (e.g., a motor or actuator) and a second moving device 200 (e.g., a motor or actuator). The first moving device 100 moves the wire clamping device 10 in a first direction X. In this way, the first moving device 100 adjusts a first deviation $\Delta X$ in the first direction X between the wire core 1*a* of the wire 1 clamped by the wire clamping device 10 and the wire welding pad 2*a* of the circuit board 2 to zero. The second moving device 200 moves the circuit board 2 in a second direction Y perpendicular to the first direction X. The second moving device 200 adjusts a second deviation $\Delta Y$ in the second direction Y between the wire core 1*a* of the wire 1 clamped by the wire clamping device 10 and the wire welding pad 2*a* of the circuit board 2 to zero.

Still referring to FIGS. 1-6, one of the first direction X and the second direction Y is parallel to an axial direction of the wire 1 clamped by the wire clamping device 10, and the other is perpendicular to the axial direction of the wire 1 clamped by the wire clamping device 10. In the illustrated embodiment, the first direction X is perpendicular to the axial direction of the wire 1 clamped by the wire clamping device 10, and the second direction Y is parallel to the axial direction of the wire 1 clamped by the wire clamping device 10.

The alignment system also includes an imaging device (e.g., a camera), a calculation device (e.g., an image processor) and a control device (e.g., a motor controller). The imaging device captures an image of the wire 1 and the circuit board 2. The calculation device calculates the first deviation $\Delta X$ and the second deviation $\Delta Y$ according to the image of the wire 1 and the circuit board 2 captured by the imaging device. This may be achieved via known image processing operations. The control device controls the first moving device 100 and the second moving device 200 to move the wire 1 and the circuit board 2 according to the first deviation ΔX and second deviation ΔY calculated by the calculation device, so as to adjust the first deviation ΔX and second deviation ΔY to zero. The alignment system also includes a third moving device (e.g., one or more motors or linear actuators). The third moving device is suitable for moving the busbar 3 in the first direction X and the second direction Y, so that the conductors 3*b* of the busbar 3 are aligned with the busbar welding pads 2*b* of the circuit board 2.

An alignment method is provided for aligning the wire cores 1*a* of the wires 1 with the wire welding pads 2*a* on the circuit board 2. The alignment method includes the steps of:

- S110: providing the above alignment system;
- S120: clamping and fixing a plurality of wires 1 by the wire clamping device 10;
- S130: moving the wire clamping device 10 in the first direction X by the first moving device 100 and moving the circuit board 2 in the second direction Y by the second moving device 200 until the first deviation ΔX and second deviation ΔY equal to zero; and
- S140: fixing the wires 1 on the base plate 21 by the wire fixing member 22 and fixing the circuit board 2 on the base plate 21 by the circuit board fixing member 23.

The alignment method may also include the steps of:

- S150: providing a busbar 3 and a third moving device for moving the busbar 3;
- S160: moving the busbar 3 in the first direction X and the second direction Y by the third moving device, so that the conductors 3*b* of the busbar 3 are aligned with the busbar welding pads 2*b* of the circuit board 2.

As shown generally in FIGS. 1-6, the first moving device 100, the second moving device 200 and the third moving device are three moving devices independent from each other. However, the present invention is not limited to this. For example, in another exemplary embodiment of the present invention, the first moving device 100, the second moving device 200 and the third moving device can be assembled into the same moving mechanism, and the same moving mechanism moves the wire 1, the circuit board 2 and the busbar 3 sequentially.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A fixing system, comprising:
- a wire clamping device adapted to clamp and fix a plurality of wires; and
- a fixture, including:
  - a base plate;
  - a wire fixing member adapted to fix the plurality of wires clamped by the wire clamping device on the base plate; and
  - a circuit board fixing member adapted to fix a circuit board on the base plate, the wire fixing member and the circuit board fixing member arranged so as to align conductors of the plurality of wires clamped by the wire clamping device with a plurality of wire welding pads of the circuit board placed on the base plate.

2. The fixing system according to claim 1, wherein an opening is formed through the base plate and positioned such that, with the circuit board fixed to the base plate, wire welding pads and busbar welding pads on a back face of the circuit board are exposed through the opening.

3. The fixing system according to claim 2, wherein the wire clamping device comprises:
- a base seat;
- a top cover rotatably connected to the base seat between an open and closed position; and
- a separating plate arranged between the base seat and the top cover to divide the plurality of wires into upper and lower layers, the upper layer of wires to be welded to wire welding pads on a front face of the circuit board, and the lower layer of wires to be welded to the wire welding pads on the back face of the circuit board.

4. The fixing system according to claim 3, wherein the base plate is adapted to be inserted between the upper layer of wires and the lower layer of wires, the upper layer of wires to be clamped between the top cover and the separating plate and the lower layer of wires to be clamped between the base seat and the separating plate.

5. The fixing system according to claim 4, wherein a thickness of the separating plate is greater than a thickness of the base plate.

6. The fixing system according to claim 3, wherein one end of the top cover is rotatably connected to the base seat by a first hinge, and the other end is fixable to the base seat by a first fastener.

7. The fixing system according to claim 3, wherein:
- each of a front face and a back face of the base plate are provided with one of the wire fixing members;
- the wire fixing member provided on the front face of the base plate is adapted to fix the upper layer of wires on the front face of the base plate; and
- the wire fixing member provided on the back face of the base plate is adapted to fix the lower layer of wires on the back face of the base plate.

8. The fixing system according to claim 2, wherein the fixture further comprises a busbar fixing member adapted to fix a busbar to the base plate after a plurality of conductors of the busbar are aligned with a plurality of busbar welding pads on the circuit board.

9. The fixing system according to claim 8, wherein:
each of a front face and a back face of the base plate are provided with one of the bus fixing members;
the busbar fixing member provided on the front face of the base plate is used to fix a first busbar to the front face of the base plate;
the busbar fixing member provided on the back face of the base plate is used to fix a second busbar to the back face of the base plate.

10. The fixing system according to claim 8, wherein the busbar fixing member is rotatably connected to the base plate between open and closed positions.

11. The fixing system according to claim 10, wherein one end of the busbar fixing member is rotatably connected to the base plate by a fourth hinge, and the other end is fixable to the base plate by a fourth fastener.

12. The fixing system according to claim 1, wherein the wire fixing member and the circuit board fixing member are each rotatably connected to the base plate between open and closed positions.

13. The fixing system according to claim 12, wherein:
one end of the wire fixing member is rotatably connected to the base plate by a second hinge, and the other end is fixable to the base plate by a second fastener; and
one end of the circuit board fixing member is rotatably connected to the base plate by a third hinge, and the other end is fixable to the base plate by a third fastener.

14. An alignment system for aligning wire conductors of wires with wire welding pads on a circuit board, comprising:
a fixing system, including:
a wire clamping device adapted to clamp and fix a plurality of wires;
a fixture, including:
a base plate;
a wire fixing member adapted to fix the plurality of wires clamped by the wire clamping device on the base plate; and
a circuit board fixing member adapted to fix a circuit board on the base plate, the wire fixing member and the circuit board fixing member arranged so as to align conductors of the plurality of wires clamped by the wire clamping device with a plurality of wire welding pads of the circuit board placed on the base plate;
a first moving device adapted to move the wire clamping device in a first direction, so as to adjust a first deviation in the first direction between the wire conductors of the wires clamped by the wire clamping device and the wire welding pads of the circuit board to zero; and
a second moving device adapted to move the circuit board in a second direction perpendicular to the first direction, so as to adjust a second deviation in the second direction between the wire conductors of the wires clamped by the wire clamping device and the wire welding pads of the circuit board to zero.

15. The alignment system according to claim 14, wherein one of the first direction or the second direction is parallel to an axial direction of the wires clamped by the wire clamping device, and the other is perpendicular to the axial direction of the wires clamped by the wire clamping device.

16. The alignment system according to claim 14, further comprising:
an imaging device for capturing an image of the wire and the circuit board;
a calculation device for calculating the first deviation and the second deviation according to the image of the wire and the circuit board captured by the imaging device; and
a control device for controlling the first moving device and the second moving device to move the wire and the circuit board according to the first deviation and the second deviation calculated by the calculation device, so as to adjust the first deviation and the second deviation to zero.

17. The alignment system according to claim 16, further comprising a third moving device for moving a busbar in the first direction and the second direction and aligning conductors of the busbar with busbar welding pads of the circuit board.

18. The alignment system according to claim 17, wherein the first moving device, the second moving device and the third moving device are assembled into a common moving mechanism, the common moving mechanism being adapted to move the wire, the circuit board and the busbar in sequence.

19. A fixing system, comprising:
a wire clamping device for clamping a plurality of wires, including:
a base seat;
a top cover rotatably connected to the base seat between an open and closed position; and
a separating plate arranged between the base seat and the top cover, adapted to divide the plurality of wires into upper and lower layers of wires; and
a fixture, including:
a base plate including a front face and a back face;
a wire fixing member provided on each of the front face and the back face of the base plate, the wire fixing member provided on the front face of the base plate for fixing the upper layer of wires on the front face of the base plate, and the wire fixing member provided on the back face of the base plate for fixing the lower layer of wires on the back face of the base plate; and
a circuit board fixing member for fixing a circuit board on the base plate, the wire fixing members and the circuit board fixing member arranged to align the upper layer of wires with wire welding pads formed on a front face of the circuit board, and to align the lower layer of wires to wire welding pads formed on a back face of the circuit board.

20. The fixing system according to claim 19, wherein the base plate is adapted to be inserted between the upper layer of wires and the lower layer of wires, the upper layer of wires being clamped between the top cover and the separating plate, and the lower layer of wires being clamped between the base seat and the separating plate.

* * * * *